UNITED STATES PATENT OFFICE.

HENRY C. MILLIGAN, OF SOUTH ORANGE, NEW JERSEY.

PROCESS OF ENAMELING IRON-WARE.

SPECIFICATION forming part of Letters Patent No. 296,206, dated April 1, 1884.

Application filed September 6, 1883. (No specimens.)

*To all whom it may concern:*

Be it known that I, HENRY C. MILLIGAN, a citizen of the United States, residing at South Orange, New Jersey, have invented new and useful Improvements in Processes of Enameling Iron-Ware, of which the following is a specification.

My invention relates to certain improvements in the manufacture of enameled iron-ware, and particularly to the process employed for producing the same. It is customary and usual to form a glaze composed of several well-known ingredients, which are fused and then ground and thoroughly mixed to about the consistency of cream, and applied to the surface of the iron, upon which it is fixed by burning in a muffle. For a full knowledge of the various ingredients used and the manner of compounding and applying the same, I refer to the many patents already granted. In all the processes with which I am familiar, one of the resultant effects of applying the glaze to the surface of the iron in a thin coating and subsequently fusing the same thereon by the application of heat in a muffle is visible spots or mottles. This effect is produced by the formation and existence in the glaze of boracic acid or some other body or bodies which combine with the iron; but whatever it may be, it is an acknowledged fact in the art of enameling iron-ware that such spots or mottles will appear, and this condition has been taken advantage of by some manufacturers, and forms the basis of one or more patents designed to cover the idea of increasing or intensifying such spots or mottles, a notable instance being Letters Patent No. 177,953. It has also been suggested that these spots may be rendered invisible by increasing the thickness of the glaze or enamel, or combining with it a pigment of such color and quantity as to obscure the spots, but in the art of enameling iron-ware it is recognized that it is desirable to have the enamel as thin as possible, in order that it shall be less liable to cracking or scaling off.

The object of my invention is to produce an enameled surface of the most desirable thinness upon iron-ware, and at the same time to have the finished article free from the spots or mottles; and with this end in view my invention consists in adding to the paste or glaze made in the usual way, and after it has been fused, ground, and mixed, an additional quantity of alkali of such quantity or strength as to successfully neutralize the boracic acid or other body or bodies, which are the resultant effect in the usual process of mixing and applying the paste or glaze, whereby I am enabled to produce a finished article of an even color, free from spots or mottles.

In compounding, fusing, grinding, and mixing the enamel, and before adding the additional alkali, I have found that any of the well-known recipes will answer; but in making my experiments I secured very satisfactory results by employing a compound consisting of forty pounds (40 lbs.) of borax, fifty pounds (50 lbs.) of silica, six pounds (6 lbs.) of soda-ash, and four pounds (4 lbs.) of kryolite. This I then fuse, then pour into water. I then take fifty pounds (50 lbs.) of the material and grind in water, adding three pounds of carbonate of magnesia, and allow to settle for about twelve hours. I then pour off the water and add one-fourth of a pound of salt (or its equivalent) and enough water to make the mass of about the consistency of cream, and I then add a suitable quantity of alkali solution to the mass—say about one pint. The alkali solution thus added I have usually obtained by mixing one pound of soda-ash with six quarts of water, and after boiling the same for a few minutes I allow it to settle and then draw off the water, which I find sufficiently strong for my purpose.

In mixing the alkali solution with the otherwise finished paste or glaze, I determine the quantity necessary by repeated tests with litmus-paper, to know when the acid in the paste has become neutralized. When the test denotes the absence of all acid in the composition, it will be understood that a sufficient quantity of alkali has been added, and the glaze is then in condition to be used in the ordinary manner.

I wish it to be understood that I am aware that it is not new, broadly, to incorporate with the usual glaze compound after it has been duly mixed an additional supply of alkali, for that has been suggested in Letters Patent No. 179,387, but in this patent the subsequent admixture of the alkali is in conjunction with the act of previously washing the surface of the iron with a solution of ferrid-cyanide of potassium or other similar coloring agent, the purpose of the invention being to produce a color or stain in imitation of "gray" or "dark veined" stones, while the purpose of my invention is to avoid any such results.

What I claim as new, and desire to secure by Letters Patent, is—

The process of enameling iron with a thin enamel, so as to produce a surface of uniform color and free from the usual spots or mottles, which consists in adding to the paste, after it has been prepared in any of the usual and well-known ways, an additional supply of alkali solution sufficient to neutralize any acid which may be present in the paste, and then applying said paste to the chemically-clean surface of the iron and fusing the same in a muffle, substantially as herein set forth.

In testimony whereof I have hereunto set my hand in the presence of two subscribing witnesses.

HENRY C. MILLIGAN.

Witnesses:
THOS. L. ROLLO,
CAESAR A. CUPPIA.